United States Patent
Yamamoto

(10) Patent No.: US 7,167,600 B2
(45) Date of Patent: Jan. 23, 2007

(54) DRAWING METHOD FOR DRAWING IMAGE ON TWO-DIMENSIONAL SCREEN

(75) Inventor: Hiroshi Yamamoto, Tokyo (JP)

(73) Assignee: Sony Computer Entertainment Inc.

( * ) Notice: Subject to any disclaimer, the term of this patent is extended or adjusted under 35 U.S.C. 154(b) by 706 days.

(21) Appl. No.: 10/012,203

(22) Filed: Oct. 19, 2001

(65) Prior Publication Data

US 2002/0089515 A1 Jul. 11, 2002

(30) Foreign Application Priority Data

Dec. 27, 2000 (JP) .................................. 2000-399461
Aug. 3, 2001 (JP) .................................. 2001-236325

(51) Int. Cl.
*G06K 9/36* (2006.01)

(52) U.S. Cl. ...................................... 382/284; 345/422
(58) Field of Classification Search ................ 382/162, 382/169, 264, 284, 305; 345/418–419, 422, 345/426, 582, 589, 600–601, 629; 358/521; 348/590; 463/31
See application file for complete search history.

(56) References Cited

U.S. PATENT DOCUMENTS

| | | | | |
|---|---|---|---|---|
| 5,280,357 A | * | 1/1994 | Desjardins | ................... 348/590 |
| 5,986,659 A | | 11/1999 | Gallery et al. | |
| 5,995,111 A | | 11/1999 | Morioka et al. | |
| 6,219,062 B1 | * | 4/2001 | Matsuo et al. | ............... 345/426 |
| 6,266,044 B1 | * | 7/2001 | Liguori | ........................ 345/589 |
| 6,266,068 B1 | * | 7/2001 | Kang et al. | .................. 345/629 |
| 6,342,882 B1 | * | 1/2002 | Oka | ............................ 345/419 |
| 6,409,598 B1 | * | 6/2002 | Takeuchi | ...................... 463/31 |
| 6,443,842 B1 | * | 9/2002 | Totsuka | ....................... 463/31 |

FOREIGN PATENT DOCUMENTS

| | | |
|---|---|---|
| EP | 0 610 080 A1 | 8/1994 |
| EP | 1 056 050 A1 | 11/2000 |
| JP | 8-007124 | 1/1996 |
| JP | 11-042370 | 2/1999 |
| JP | 11-242753 | 9/1999 |
| JP | 2000-132706 | 5/2000 |
| JP | 2001-250127 | 9/2001 |
| JP | 2002-92630 | 3/2002 |
| WO | WO 00/52640 | 9/2000 |

OTHER PUBLICATIONS

Notification of Reason(s) for Refusal dated Jan. 4, 2005.
Notice of Reason(s) for Refusal dated May 11, 2005.
European Search Report dated Aug. 23, 2004.

* cited by examiner

*Primary Examiner*—Kanjibhai Patel
(74) *Attorney, Agent, or Firm*—Katten Muchin Rosenman LLP

(57) ABSTRACT

A value for expressing distance from a virtual viewpoint is set to every predetermined compositional unit of a first image; a second image is generated; a coefficient is defined corresponding to the value for expressing the distance set to every predetermined compositional unit; and the first image and the second image are synthesized based on the coefficient defined for every predetermined compositional unit. This successfully creates an image with a natural perspective by which the compositional unit is blurred according to the distance thereof from the virtual viewpoint, while causing only a small load to CPU.

39 Claims, 9 Drawing Sheets

FIG. 2

| No. | R  | G  | B  | A  |
|-----|----|----|----|----|
| 00  | ff | 00 | 00 | 80 |
| 01  | 00 | ff | 00 | 80 |
| 02  | 00 | 00 | 00 | 80 |
| 03  | 00 | 00 | 00 | 80 |
| .   | .  | .  | .  | .  |
| .   | .  | .  | .  | .  |
| .   | .  | .  | .  | .  |
| ff  | 00 | 00 | 00 | 80 |

| 00 | 00 | 00 | 01 | 01 | 00 | 00 | 00 |
|----|----|----|----|----|----|----|----|
| 00 | 00 | 00 | 01 | 01 | 00 | 00 | 00 |
| 00 | 00 | 00 | 01 | 01 | 00 | 00 | 00 |
| 00 | 00 | 00 | 01 | 01 | 00 | 00 | 00 |
| 01 | 01 | 01 | 01 | 01 | 01 | 01 | 01 |
| 01 | 01 | 01 | 01 | 01 | 01 | 01 | 01 |
| 00 | 00 | 00 | 01 | 01 | 00 | 00 | 00 |
| 00 | 00 | 00 | 01 | 01 | 00 | 00 | 00 |
| 00 | 00 | 00 | 01 | 01 | 00 | 00 | 00 |

| No. | R | G | B | A |
|---|---|---|---|---|
| 00 | ff | 00 | 00 | ff |
| 01 | 00 | ff | 00 | fe |
| 02 | 00 | 00 | 00 | fd |
| 03 | 00 | 00 | 00 | fc |
| . | . | . | . | . |
| . | . | . | . | . |
| . | . | . | . | . |
| ff | 00 | 00 | 00 | 00 |

FIG. 5

| Most significant byte | Second byte | Least significant byte |
|---|---|---|

DRAWING METHOD FOR DRAWING IMAGE ON TWO-DIMENSIONAL SCREEN

The subject application is related to subject matter disclosed in the Japanese Patent Application No. Tokugan 2000-399461 filed on Dec. 27, 2000 and Tokugan 2001-236325 filed on Aug. 3, 2001 in Japan, based on which this application claims priority under the Paris Convention and which is incorporated by reference herein.

BACKGROUND OF THE INVENTION

1. Field of the Invention

The present invention relates to a drawing method for drawing an image on a two-dimensional screen such as on a television monitor device and a drawing device therefore, a computer readable recording medium having recorded therein a draw processing program to be executed on a computer, a program execution device for executing the draw processing program, and a draw processing program to be executed on a computer.

2. Description of the Related Art

There are accelerating trends toward higher integration and higher speed as for processors, memories and so forth of recent television game machine and personal computer. Such advancement enables real-time generation of a three-dimensional image having an excellent presence and perspective (feel of depth) and display thereof on a two-dimensional monitor screen.

For the case a three-dimensional image is drawn on a two-dimensional monitor screen, it is a general practice to subject a three-dimensional polygonal data to geometric processing such as coordinate transformation, clipping and lighting, and the obtained data are then transformed by perspective projection transformation.

For the case a three-dimensional image is drawn on a two-dimensional monitor screen, a widely adopted technique for expressing perspective or reducing affection by flicker caused by shrunk drawing of distant polygons is such that drawing the image in focus at a portion close to a virtual viewpoint but blurred at a portion distant from the virtual viewpoint.

In a conventional method for drawing a blurred image depending on the distance thereof from the virtual viewpoint, an original image are, for example, stepwisely shrunk corresponding to the distance from a virtual viewpoint and then enlarged again, and the enlarged images is synthesized with the original image according to distance in the depth direction (Z value) from the virtual viewpoint set for every pixel.

Such stepwise shrinking depending on the distance from the virtual viewpoint and corresponding enlargement, however, increases a load of image processing by the CPU, which will adversely affect other processing in progress of a game.

On the other hand, reducing the number of steps of shrinking and enlargement in the blurring in order to reduce the load of the CPU will be unsuccessful in obtaining a desired blurring effect and will thus fail in obtaining a desirable perspective.

SUMMARY OF THE INVENTION

The present invention was proposed to address the foregoing problems, and an object thereof resides in that providing a drawing method, a drawing device, a computer readable recording medium having recorded therein a draw processing program to be executed on a computer, a program execution device for executing the draw processing program, and a draw processing program to be executed on a computer; all of which are aimed at reducing load on a CPU when an image is drawn as being blurred depending on distance from a virtual viewpoint, and at obtaining a desired blurring depending on the distance from the virtual viewpoint to thereby create a desirable perspective.

In the present invention, a value for expressing distance from a virtual viewpoint is set for every compositional unit of a first image, a second image is generated, a coefficient corresponding to such value for expressing the distance set to every predetermined compositional unit is defined, and the first image and the second image are then synthesized based on the coefficient defined for every predetermined compositional unit.

In particular in the present invention, the first image is blurred to generate the second image, and the first image and the second image are synthesized using a semi-transparent coefficient such that increasing a ratio of the second image as the distance from the virtual viewpoint increases, so that an image can be obtained as being in focus at a portion close to a virtual viewpoint and blurred to a larger extent at a portion apart further from the virtual viewpoint.

Other and further objects and features of the present invention will become obvious upon understanding of the illustrative embodiments about to be described in connection with the accompanying drawings or will be indicated in the appended claims, and various advantages not referred to herein will occur to one skilled in the art upon employing of the invention in practice.

BRIEF DESCRIPTION OF THE DRAWINGS

FIG. 2 is a chart for explaining a general CLUT (Color Look-Up Table);

FIG. 3 is a chart for explaining index for defining R, G and B from the CLUT;

FIG. 4 is a chart for explaining CLUT containing gradational α values;

FIG. 5 is a chart for explaining a Z value expressed in three bytes;

DETAILED DESCRIPTION OF THE PREFERRED EMBODIMENTS

Figure 1:
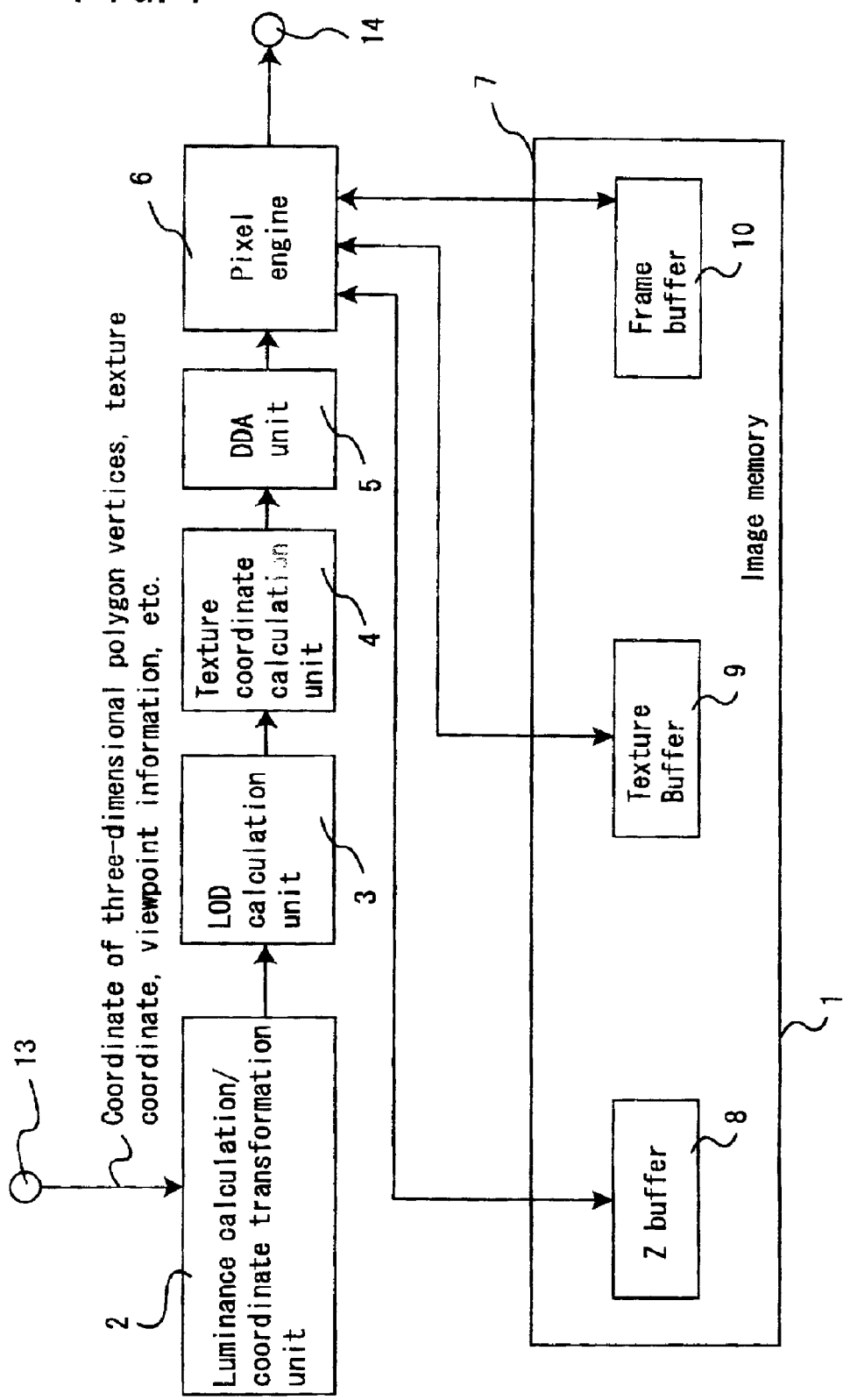
FIG. 1 is a block diagram showing an exemplary schematic constitution of a major portion of a drawing device according to an embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Constitution of Drawing Device According to the Present Embodiment

FIG. 1 shows an exemplary schematic constitution of a major portion of a drawing device 1 according to an embodiment of the present invention.

The drawing device 1 now in this embodiment is such that for drawing a two-dimensional image based on texture mapping onto three-dimensional polygons, and is applicable, for example, to television game machine, personal computer and three-dimensional graphical device (in particular to so-called graphic synthesizer).

The drawing device 1 of this embodiment shown in FIG. 1 mainly comprises a luminance calculation/coordinate transformation unit 2, an LOD (Level OF Detail) calculation unit 3, a texture coordinate calculation unit 4, a DDA (Digital Differential Analyzer) unit 5, a pixel engine 6 and an image memory 7.

The image memory 7 further comprises the individual storage regions, that is, a Z buffer 8 for storing values in the depth direction from a virtual viewpoint (typically expressed with 3 byte, 24 bits in total), a texture buffer 9 for storing data such as texture for generating by mapping an entire color and pattern on polygons and CLUT (Color Look-Up Table), and a frame buffer 10 for storing and synthesizing frame data displayed on a two-dimensional monitor screen.

To an input terminal 13 of the drawing device 1 provided with such components, various information for drawing a three-dimensional image, such as those for polygon, texture, light source and viewpoint, are entered. Such various information is supplied through a communication line, storage device and so forth.

The three-dimensional polygon information comprises those, for example, of coordinates (x, y, z) for the individual vertices of a triangular polygon and normal lines at the individual vertices; and the viewpoint information and the light source information are those for enabling luminance calculation and coordinate transformation with regard to such polygon. Now the light source information is by no means limited to that for expressing information for a single light source but also may be such that expressing information for a plurality of light sources.

The texture information comprises information for texture coordinate corresponding to the individual vertices of the triangular polygon and CLUT used for expressing color or pattern.

The CLUT herein is composed of a three-primary-color table for R (red), G (green) and B (blue), and an α value table. The three-primary-color table is used for defining colors of the individual pixels in the texture. The α value is a coefficient for expressing semi-transparency, which is responsible for defining a radio of image blending (α blending) when the texture is mapped. In this embodiment, the α values in the CLUT are graded in a plurality of steps, where details of which will be described later. The table number of the CLUT and the α value are correlated so that a larger table number corresponds to a smaller (or a larger) α value.

An index for withdrawing three-primary-color values for R, G and B from the CLUT (that is, a value for designating a table number of the CLUT) is set for every pixel expressed by an XY coordinate of the texture. In particular for the case of this embodiment according to the present invention, while details of which will be described later, the second byte of the Z value (expressed with 3 bytes, 24 bits in total) for the individual pixels is used as an index for withdrawing the α value from the CLUT. In this embodiment, the Z value is set so as to be smaller as the distance from a virtual viewpoint becomes larger.

Such a variety of information is first entered into the luminance calculation/coordinate transformation unit 2 of the drawing device 1.

The luminance calculation/coordinate transformation unit 2 transforms the entered individual coordinate information of polygons into coordinate values in another coordinate system for two-dimensional drawing, and calculates the luminance at the individual vertices of the polygons based on the viewpoint information and light source information. The luminance calculation/coordinate transformation unit 2 is also responsible for other processing beside such calculation. The individual values calculated by the luminance calculation/coordinate transformation unit 2 are then entered into the LOD calculation unit 3.

The LOD calculation unit 3 calculates an LOD (Level Of Detail) value, which is used when the pixel engine 6 reads out a texture from the texture buffer 9, using the Z coordinate of thus-transformed polygon. Now the LOD value is a value calculated from a reduction ratio according to which the polygon is shrunk, and typically obtained as a logarithmic value of a distance from the viewpoint to the polygon. The obtained LOD value is then sent via the DDA unit 5 to the pixel engine 6.

The texture coordinate calculation unit 4 calculates a texture coordinate value used when the pixel engine 6 reads out a texture from the texture buffer 9. The obtained texture coordinate value is then sent via the DDA unit 5 to the pixel engine 6.

The DDA unit 5 transforms the two-dimensional polygon vertices information, Z coordinate values, luminance information and so forth into pixel information. More particularly, for the individual pixels, coordinate values thereof, Z values, luminance values and texture coordinate values are sequentially defined based on linear interpolation. The output from the DDA unit 5 is then sent to the pixel engine 6.

The pixel engine 6 controls read/write operations to or from the Z buffer 8, texture buffer 9 and frame buffer 10; and is also responsible for texture mapping, comparison of Z coordinate values, pixel value calculation and so forth.

The pixel engine 6 not only withdraws three-principal-color data of R, G and B from the CLUT corresponding to the index of the texture to thereby set color for the individual pixels, but also withdraws α values, which is later used for α blending, from the CLUT using the second byte of the Z value of the individual pixels, detailed process flow of which will be described later.

The pixel engine 6 is also responsible for various processing such as scissoring, dithering and color clamping. The scissoring refers to a processing for removing data overflowed from the displayable area; the dithering refers to a processing for complicating arrangement of each color in order to express many colors using only a small number of principal colors; and the color clamping refers to a processing for limiting the calculated color value so as not to exceed 255 or become smaller than zero.

Image data obtained after such processing by the pixel engine 6 are stored into the frame buffer 10 to thereby generate frame data to be drawn on the two-dimensional monitor screen (two-dimensional image data), and such two-dimensional image data is then read out from the frame buffer 10, output from an output terminal 14, and sent to the two-dimensional monitor device.

Draw Processing of the Embodiment

Details of the CLUT according to this embodiment, setting of texture color or pattern using such CLUT, and the α blending will be explained in comparison with setting of texture color or pattern using a general CLUT and the α blending.

Typical Draw Processing using General CLUT

Prior to explanation of an exemplary drawing using CLUT according to this embodiment, relation between the three-principal-color data for R, G and B and α value in a general CLUT will be explained. FIG. 2 shows a typical example of a general CLUT, and FIG. 3 shows an XY coordinate of individual pixels composing the texture and an example of indices for defining color or pattern of such individual pixels.

The CLUT shown in FIG. 2 comprises table numbers (No.), color data for R, G and B, and α values (values listed in column "A"). The table numbers, color data for R, G and B, and α values are respectively expressed in hexadecimal numbers. The table numbers are those specified by the index of the individual pixels; values of the color data for R, G and B indicate levels of such three principal colors; and α values indicate the degree of semi-transparency.

Referring now to FIGS. 2 and 3, index "00" in FIG. 3 corresponds to table No. "00" in FIG. 2; index "01" to table No. "01"; index "02" to table No. "02"; index "03" to table No. "03" and so on. The individual pixels having index of "00" in FIG. 3 are assigned with a color of R (red) which is apparent from FIG. 2 showing that table No. "00" corresponds to "ff" for R, "00" for G and "00" for B. Similarly, the individual pixels having index of "01" in FIG. 3 are assigned with a color of G (green), which is apparent from FIG. 2 showing that table No. "01" corresponds to "00" for R, "ff" for G and "00" for B. Thus an exemplary texture drawn according to FIGS. 2 and 3 appears as a green cross on a red background.

According to the CLUT shown in FIG. 2, the individual pixels having index of "00" in FIG. 3 are assigned with an α value of "80" which is corresponded to table No. "00" in FIG. 2, and similarly, the individual pixels having index of "01" in FIG. 3 are also assigned with an α value of "80" which is corresponded to table No. "01" in FIG. 2. Such α value of "80" represents a degree of semi-transparency of approx. 0.5 (i.e., 50%), so that the green cross on the red background is drawn so as to overlap an already-drawn image in a 50% transparency.

As is clear from the above, using the general CLUT and indices shown in FIGS. 2 and 3 allows determination only of color or pattern of the texture and the ratio of image blending in the α blending.

Typical Draw Processing using CLUT of the Embodiment

While FIGS. 2 and 3 in the above showed a general CLUT and a typical use thereof, the embodiment of the present invention employs a CLUT having α values gradationally composed therein and a predetermined value in the Z value for the individual pixels as indices for defining the α values in the CLUT (the second byte of a three-byte Z value as shown in FIG. 5 in this embodiment) to thereby allow the α blending according to distance in the depth direction of drawn objects from a virtual viewpoint. Determination of color or pattern of the texture can be proceeded as described in the above referring to FIGS. 2 and 3.

That is, in this embodiment, the α values in the CLUT are gradationally set so that the larger value thereof corresponds to higher semi-transparency (lower transparency), and the second byte of the Z value, whose value decreases as the distances from the virtual viewpoint increase, is used as an index for selecting the α values, to thereby determine an α plane. The α blending, using such α plane, of a current image and a blurred image thereof, for example, can provide an image in which an object or the like close to the virtual viewpoint is in focus and those apart from the virtual viewpoint are gradually blurred as the distance from such virtual viewpoint increases.

In other words, the embodiment can provide an image in which an object or the like close to the virtual viewpoint is well focused and those apart from the virtual viewpoint are gradually blurred as the distance from such virtual viewpoint increases, just like an image obtained by photographing while focusing on an object close to the viewpoint under setting of a shallow depth of field, where even objects or the like apart from the focal position retain the color to thereby attain a natural perspective. Such image totally differs from a pan-focal image well focused irrespective of the distance from a viewpoint, which is obtainable by photographing using a photographic optical system while setting a large depth of field of a photographing lens.

Figure 6:
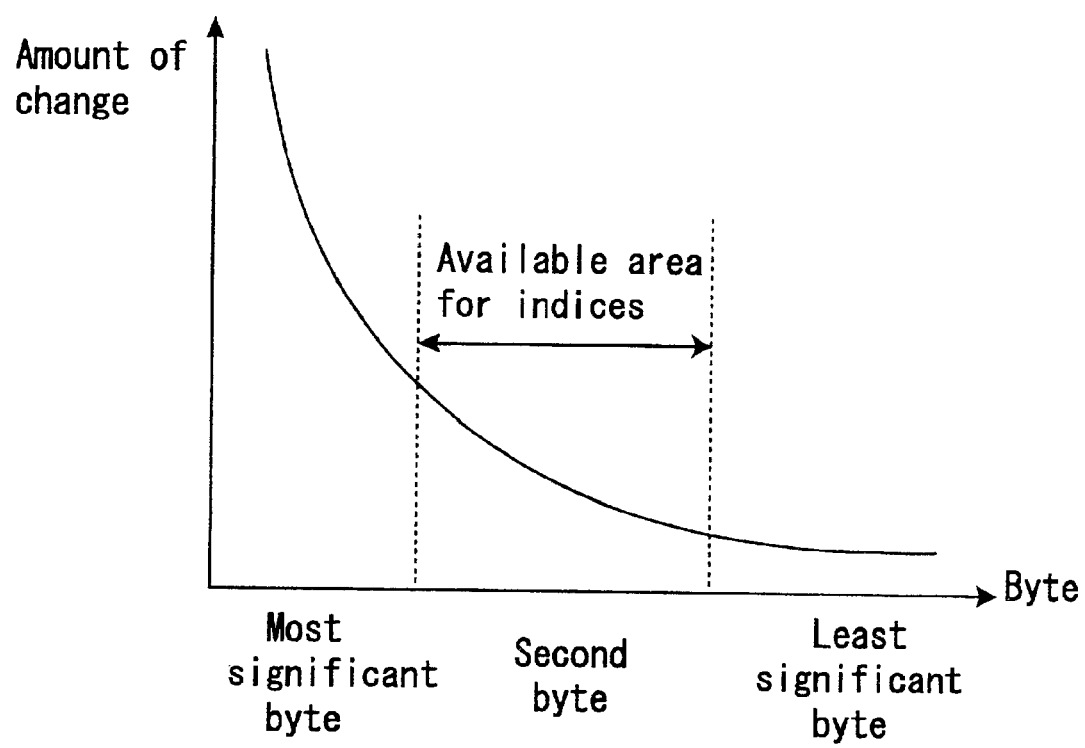
FIG. 6 is a graph for explaining a case in which the second byte of the Z value is adopted as an index for defining the α value from the CLUT of this embodiment.

A reason why in this embodiment the second byte of the Z value expressed with 3 bytes (24 bits) as shown in FIG. 5 is used as an index for defining the α values of the CLUT shown in FIG. 4 is that the amount of change of the Z value is in inverse proportion to that for bit values in the individual bytes as shown in FIG. 6. As is clear from FIG. 6, using the least significant byte of the Z value will result in too large changes in the bit values, and looping of the bit value may occur in a worst case in which the same bit values may repetitively be generated. On the other hand, using the most significant byte of the Z value will result in too small changes in the bit values. Thus the second byte of the Z value is to be used as an index for defining the α values of the CLUT.

That is, when a predetermined byte of the Z value is used as an index for defining the α values, too large changes in the index designated by such predetermined byte result in large changes also in the α values defined by such index, which undesirably sharpens changes in the α-blended image and ruins the natural perspective. When the looping of bits in the predetermined byte should occur, an appropriate relation between the distance from the virtual viewpoint and the α value can no more be retained and the obtained image will be denaturalized badly. On the other hand, too small changes in the index designated by such predetermined byte result in too small changes in the α values defined by such index, which only produces no significant change in the resultant α-blended image and fails in producing a desirable perspective. For such reasons, the second byte of the Z value is used as an index for the α values in this embodiment, which can yield an appropriate perspective.

Flow of Draw Processing using CLUT and Z Values in the Embodiment

The following paragraphs describe, referring to a specific example of the drawing, a process flow of the draw processing capable of obtaining natural perspective by using the CLUT according to this embodiment (CLUT having gradationally composed α values) and the second byte of the Z value as an index for the α values.

Figure 7:
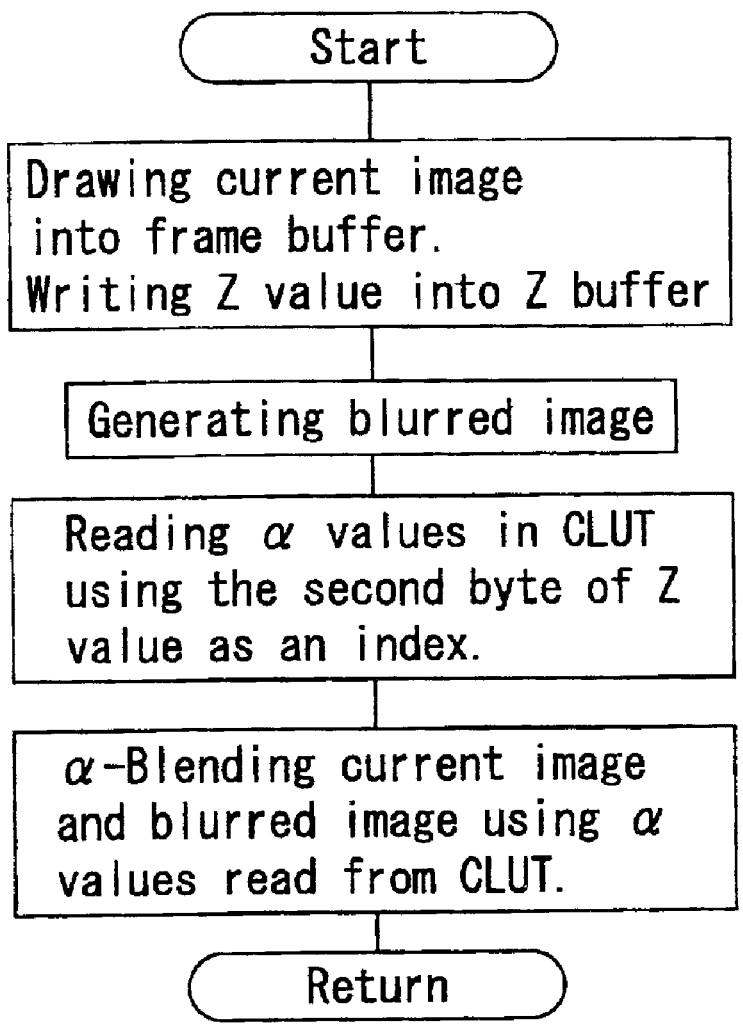
FIG. 7 is a flow chart showing a schematic process flow in a draw processing in this embodiment.

FIG. 7 shows a schematic flow of the draw processing according to the embodiment. It should now be noted that the processing described below is such that being executed mainly by the pixel engine 6 using data stored in the image memory 7.

As shown in FIG. 7, the pixel engine 6 first in step S1 draws a current image (a first image in the present invention) into the frame buffer 10, and writes a Z value in the Z buffer 8.

Figure 8:
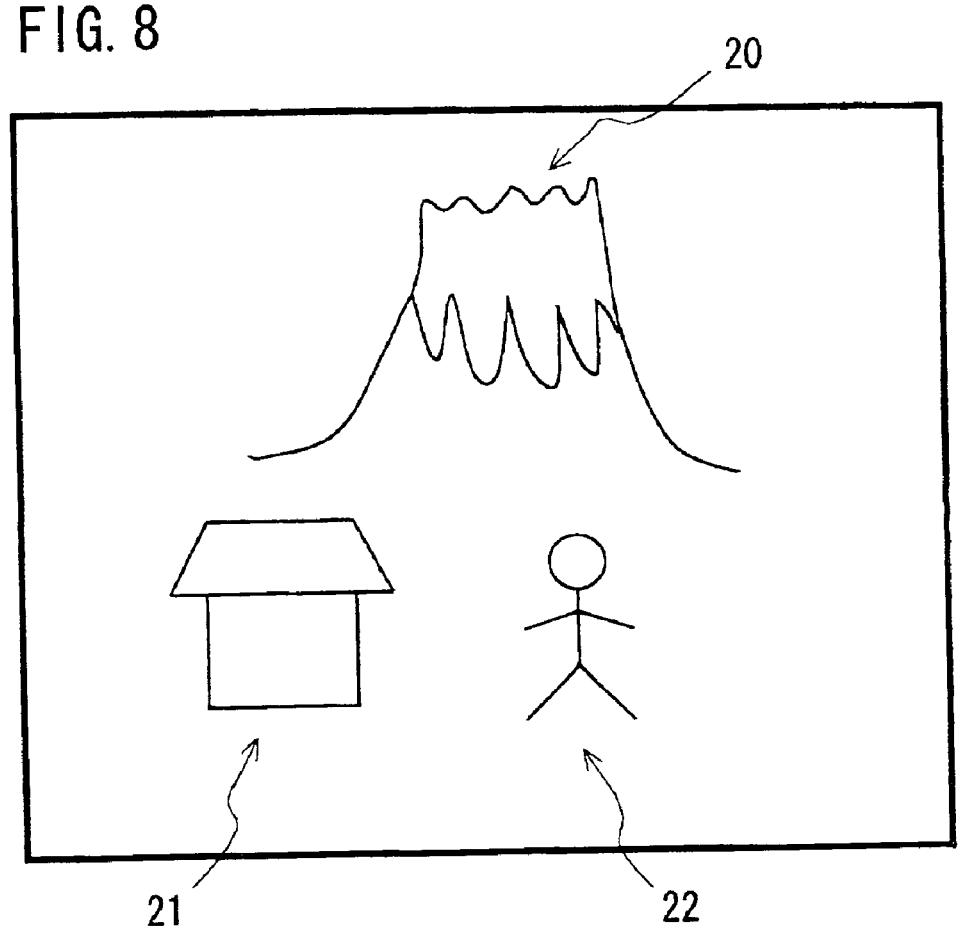
FIG. 8 is a chart showing an exemplary current image before being added with perspective.

The current image herein comprises a "mountain" object 20, a "house" object 21 and a "human" object 22, where the "mountain" object 20 is placed most apart from a virtual viewpoint, the "human" object 22 is placed close to the virtual viewpoint, and the "house" object 21 is placed at an intermediate point therebetween, as shown in FIG. 8. A background image other than these objects is omitted herein for simplicity of the explanation.

The pixel engine 6 next in step S2 generates a blurred image of the current image (a second image in the present invention), and stores such blurred image into another storage area in the frame buffer 10. It is now also allowable to provide a separate frame buffer beside the frame buffer 10 and store the blurred image into such separate frame buffer. There is known a variety of techniques for producing the blurred image, and one example of which is such that synthesizing the current image with a slightly shifted image thereof.

Figure 9:
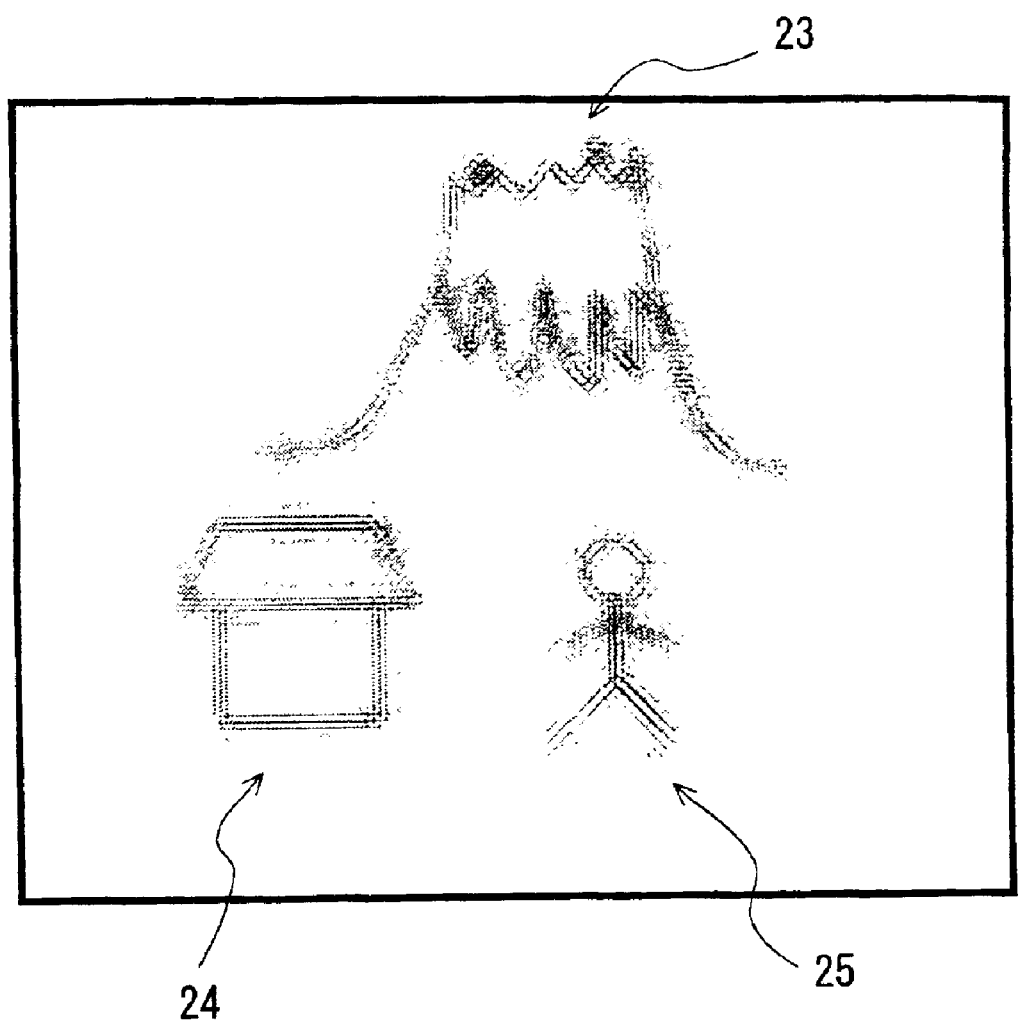
FIG. 9 is a chart showing an exemplary blurred image obtained by entirely blurring the current image.

The blurred image generated in step S2 is composed, for example, of a blurred image 23 of the "mountain" object 20 shown in FIG. 8, a blurred image 24 of the "house" object 21 and a blurred image 25 of the "human" object 22, as shown in FIG. 9. The degrees of the blurring of the blurred images 23, 24 and 25 are the same.

The pixel engine 6 next in step S3 reads out the α value from the CLUT shown in FIG. 4 using the second byte of the Z value, written in the Z buffer 8, for the individual pixels in the current image shown in FIG. 8.

As has been described in the above, in the current image shown in FIG. 8, the "mountain" object 20 is most apart from the virtual viewpoint, the "human" object 22 is most close to the virtual viewpoint, and the "house" object 21 is placed at an intermediate distance. So that the Z values for the individual pixels of the current image shown in FIG. 8 are largest for the pixels composing the "mountain" object 20, smallest for those composing the "human" object 22, and intermediate for the "house" object 21. When the second byte of such Z value is used as an index for withdrawing the α value from the CLUT shown in FIG. 4, the α value corresponding to the individual pixels is largest for those composing the "mountain" object 20 (maximum degree of semi-transparency) smallest for those composing the "human" object 22 (minimum degree of semi-transparency), and intermediate for those composing the "house" object 21 (intermediate degree of semi-transparency).

The pixel engine 6 next in step S4 proceeds the α-blending of the current image shown in FIG. 8 and the blurred image shown in FIG. 9, both of which being stored in the frame buffer 10, using an α plane composed of the α values read out in the process of step S3.

Figure 10:
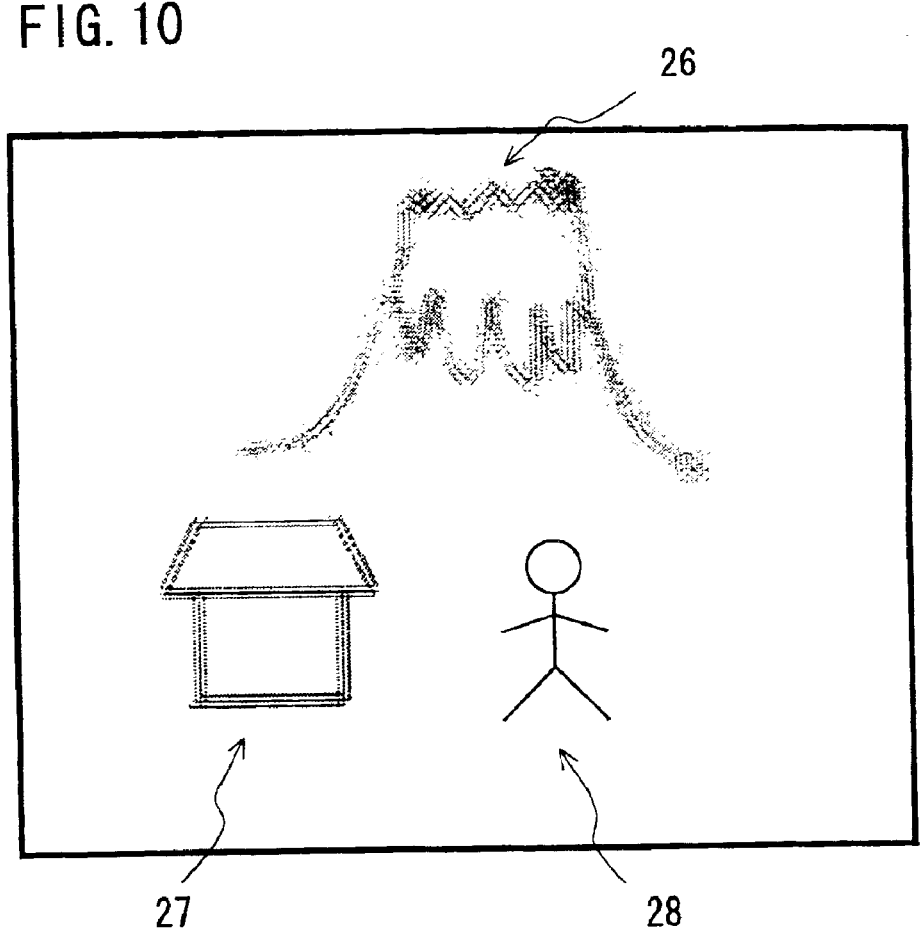
FIG. 10 is a chart showing an exemplary image having a natural perspective generated by the draw processing of this embodiment.

Since the degree of semi-transparency is largest for the individual pixels composing the "mountain" object 20, smallest for those composing the "human" object 22, and intermediate for those composing the "house" object 21 in such α plane, an image obtained by α-blending of the current image shown in FIG. 8 and the blurred image shown in FIG. 9 is such that shown in FIG. 10.

More specifically, since the portion of the "mountain" object has the largest degree of semi-transparency, in which the blurred image accounts for a larger ratio than the current image, so that such object is drawn as a blurred image 26 as shown in FIG. 10. On the other hand, since the portion of the "human" object has the smallest degree of semi-transparency, in which the current image accounts for a larger ratio than the blurred image, so that such object is drawn as an in-focal image 28. Since the portion of the "house" object has the intermediate degree of semi-transparency, so that such object is drawn as an image 27 not so well-focused than the image 28 but not so blurred than the image 26.

It is now also allowable for the pixel engine 6 to practice the processing as shown by the flow chart of FIG. 7 on the hardware basis such as DSP (Digital Signal Processor), or on the software basis with the aid of draw processing programs such that being sent via a communication line such as CPU, or such that being read out by a storage device from a storage medium such as DVD or CD-ROM. In particular, a draw processing program used for the case that the draw processing by the pixel engine 6 is practiced on the software basis is such that sequentially executing the individual process steps explained referring to the flow chart of FIG. 7. Such draw processing program can not only be installed previously as a processing program for the pixel engine 6, but can also be entered through the input terminal 13 shown in FIG. 1 at the same time with, or in advance of entering the polygon information.

Figure 11:
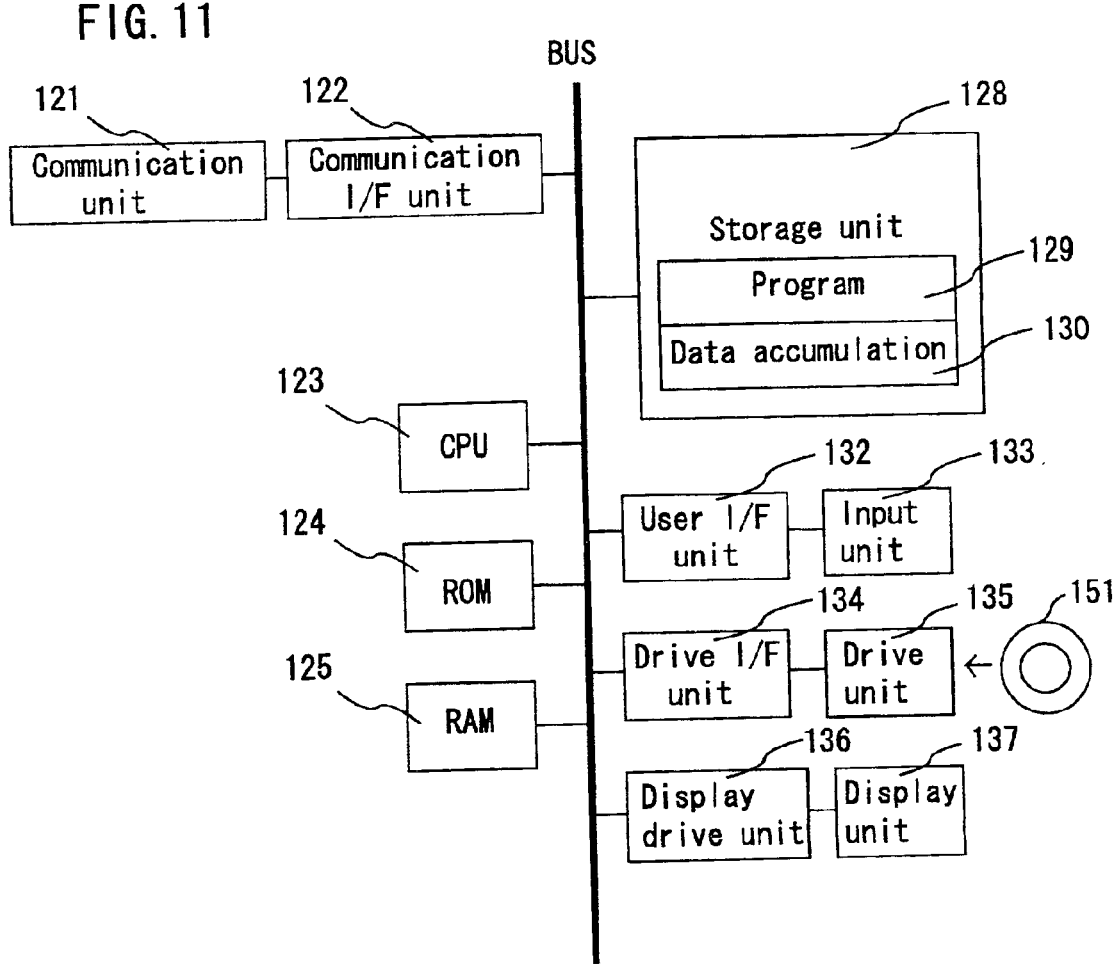
FIG. 11 is a block diagram showing a schematic constitution of a personal computer for executing a draw processing program whose process flow was shown in FIG. 7.

As a specific example of a constitution for practicing the draw processing of this embodiment on the software basis, FIG. 11 shows a schematic constitution of a personal computer on which the draw processing program whose process flow was shown in FIG. 7 is run. Now in this embodiment, the draw processing program is mainly executed by a CPU 123 shown in FIG. 11.

In FIG. 11, a storage unit 128 comprises, for example, a hard disk and a driver therefore. The hard disk has stored therein an operating program; draw processing program 129 of this embodiment incorporated for example by installation from various recording media such as a CD-ROM and DVD-ROM, or downloading via a communication line; and various data 130 typically including graphic information for polygon drawing, texture, Z value, general texture, color value and α value.

The communication unit 121 is a communication device responsible for data communication with the external, such as a modem allowing connection to an analogue public telephone line, a cable modem allowing connection to a cable television network, a terminal adaptor allowing connection to ISDN (Integrated Services Digital Network), and a modem allowing connection to ADSL (Asymmetric Digital Subscriber Line). A communication interface (I/F) unit 122 is an interface device responsible for protocol conversion which enables data exchange between the communication unit 121 and an internal bus.

An input unit 131 is an input device such as a keyboard, mouse and touch pad. A user interface (I/F) unit 132 is an interface device for supplying signals from the input unit 133 to the internal unit.

A drive unit 135 is a drive device capable of reading various data and programs including the draw processing program according to this embodiment from a recording medium such as a card-type semiconductor memory. A drive interface (I/F) unit 134 is an interface device for supplying signals from the drive unit 135 to the internal unit.

A display unit 137 is a display device such as a CRT (cathode ray tube) or LCD (liquid crystal display). A display drive unit 136 is a drive device responsible for driving such display unit 137 for display.

A ROM 124 typically comprises a re-loadable non-volatile memory such as a flash memory, and stores a BIOS (Basic Input/Output System) and various initial set values of the personal computer. A RAM 125 is a device into which application programs read out from the hard disk in the storage unit 128 or various data are loaded, and is used as a working RAM for the CPU 123.

The CPU 123 controls the entire operations of the personal computer as well as executes the foregoing draw processing based on the operating system programs or the draw processing program 129 of this embodiment stored in the storage unit 128. That is, in the constitution shown in FIG. 11, The CPU 123 executes the draw processing program of this embodiment, which is one of the application programs read out from the hard disk of the storage unit 128 and loaded into the RAM 125, to thereby enable the draw processing described in the foregoing embodiment.

As has been described in the above, the embodiment can provide an image in which an object or the like close to the virtual viewpoint is well focused and those apart from the virtual viewpoint are gradually blurred as the distance from such virtual viewpoint increases, where even objects or the like apart from the focal position retain the color to thereby attain a natural perspective.

In the conventional drawing technique, blurred images were generated by multi-step shrinkage and the corresponding enlargement to thereby achieve the perspective, and such blurred images obtained from such multi-step processing were then synthesized with an original image, so that the amount of image processing could not be reduced. On the contrary in this embodiment, the perspective is achieved by α-blending the current image and a single blurred image using an α-plane comprising α values corresponding to the distances from the virtual viewpoint, so that the amount of image processing does not increase even when the distance from the virtual viewpoint is expressed in 256 steps (1 byte), which desirably ensures load reduction for CPU and speed-up of the processing.

The embodiment described in the above is only part of the examples of the present invention. It is therefore to be understood that the present invention may be practiced in any modifications depending on the design or the like otherwise than as specifically described herein without departing from the scope and the technical spirit thereof.

For example, while a case of α-blending the current image and a blurred image using the α-plane was exemplified, such α-plane is also available for blending an arbitrary color with the current image, which produces an image in which the objects or the like seem to be fused into the arbitrary color as the distance from the viewpoint increases. Such technique is advantageous in achieving fogging, in which an object is more heavily fogged as the distance thereof from the viewpoint increases. It becomes also possible to create a special effect by α-blending an arbitrary image and the current image using such α-plane.

While the α value was defined based on the Z value for every pixel in the above embodiment, it is still also allowable to define the α-value according to the distance from the virtual viewpoint for every polygon or object.

What is claimed is:

1. A drawing method, comprising the steps of:
   setting a value for expressing distance from a virtual viewpoint to every predetermined compositional unit of a first image;
   generating a second image from the first image;
   defining a coefficient corresponding to the value for expressing the distance set to every predetermined compositional unit, wherein the coefficient is defined using a predetermined byte when the value for expressing the distance for every predetermined compositional unit is composed of at least three bytes;
   synthesizing the first image and the second image based on the coefficient defined for every predetermined compositional unit; and
   outputting the synthesized image.

2. The drawing method according to claim 1, wherein the coefficient is extracted from a table having a plurality of coefficients gradationally composed therein using the value for expressing the distance for every predetermined compositional unit as an index.

3. The drawing method according to claim 1, wherein the second byte is selected as the predetermined byte for the case that the value is composed of three bytes.

4. The drawing method according to claim 1, wherein the coefficient is defined as a semi-transparent coefficient such that increasing a ratio of the second image as the distance from the virtual viewpoint increases.

5. The drawing method according to claim 1, wherein the second image is generated by subjecting the first image to a predetermined image processing.

6. The drawing method according to claim 5, wherein the predetermined image processing for the first image is blurring.

7. The drawing method according to claim 1, wherein the second image is generated using an arbitrary color.

8. The drawing method according to claim 1, wherein the predetermined compositional unit is a pixel.

9. A drawing device, comprising:
   a distance setting means for setting a value for expressing distance from a virtual viewpoint to every predetermined compositional unit of a first image;
   an image generation means for generating a second image from the first image;
   a coefficient definition means for defining a coefficient corresponding to the value for expressing the distance set to every predetermined compositional unit, wherein the coefficient is defined using a predetermined byte when the value for expressing the distance for every predetermined compositional unit is composed of at least three bytes;
   a synthetic means for synthesizing the first image and the second image based on the coefficient defined for every predetermined compositional unit; and
   an output means for outputting the synthesized image.

10. The drawing device according to claim 9, wherein the coefficient definition means extracts the coefficient from a table having a plurality of coefficients gradationally composed therein using the value for expressing the distance for every predetermined compositional unit as an index.

11. The drawing device according to claim 9, wherein the coefficient definition means selects the second byte as the predetermined byte for the case that the value is composed of three bytes.

12. The drawing device according to claim 9, wherein the coefficient definition means defines the coefficient as a semi-transparent coefficient such that increasing a ratio of the second image as the distance from the virtual viewpoint increases.

13. The drawing device according to claim 9, wherein the image generation means generates the second image by subjecting the first image to a predetermined image processing.

14. The drawing device according to claim 13, wherein the image generation means subjects the first image to blurring as the predetermined image processing.

15. The drawing device according to claim 9, wherein the image generation means generates the second image using an arbitrary color.

16. The drawing device according to claim 9, wherein the distance setting means sets the distance for every pixel as a compositional unit.

17. A computer-readable recording medium having recorded therein a draw processing program to be executed on a computer, the draw processing program comprising:

a distance setting step for setting a value expressing distance from a virtual viewpoint to every predetermined compositional unit of a first image;

an image generation step for generating a second image from the first image;

a coefficient definition step for defining a coefficient corresponding to the value for expressing the distance set to every predetermined compositional unit;

a synthetic step for synthesizing the first image and the second image based on the coefficient defined for every predetermined compositional unit; and an output step for outputting the synthesized image, wherein the coefficient definition step further comprises a step for defining such coefficient using a predetermined byte for the case that the value for expressing the distance for every predetermined compositional unit is at least three bytes.

18. The computer-readable recording medium having recorded therein a draw processing program according to claim 17, wherein the coefficient definition step further comprises a step for extracting such coefficient from a table having a plurality of coefficients gradationally composed therein using the value for expressing the distance for every predetermined compositional unit as an index.

19. The computer-readable recording medium having recorded therein a draw processing program according to claim 17, wherein the coefficient definition step further comprises a step for selecting the second byte as the predetermined byte for the case that the value is composed of three bytes.

20. The computer-readable recording medium having recorded therein a draw processing program according to claim 17, wherein the coefficient definition step further comprises a step for defining as such coefficient a semi-transparent coefficient such that increasing a ratio of the second image as the distance from the virtual viewpoint increases.

21. The computer-readable recording medium having recorded therein a draw processing program according to claim 17, wherein the image generation step further comprises a step for generating the second image by subjecting the first image to a predetermined image processing.

22. The computer-readable recording medium having recorded therein a draw processing program according to claim 21, wherein the image generation step further comprising a step for subjecting the first image to blurring as the predetermined image processing.

23. The computer-readable recording medium having recorded therein a draw processing program according to claim 17, wherein the image generation step further comprises a step for generating an image composed of an arbitrary color as the second image.

24. The computer-readable recording medium having recorded therein a draw processing program according to claim 17, wherein the predetermined compositional unit is a pixel.

25. A program execution device for executing a draw processing program, such draw processing program comprising:

a distance setting step for setting a value expressing distance from a virtual viewpoint to every predetermined compositional unit of a first image;

an image generation step for generating a second image from the first image;

a coefficient definition step for defining a coefficient corresponding to the value for expressing the distance set to every predetermined compositional unit;

a synthetic step for synthesizing the first image and the second image based on the coefficient defined for every predetermined compositional unit; and an output step for outputting the synthesized image, wherein the coefficient definition step further comprises a step for defining such coefficient using a predetermined byte for the case that the value for expressing the distance for every predetermined compositional unit is at least three bytes.

26. The program execution device for executing a draw processing program according to claim 25, wherein the coefficient definition step further comprises a step for extracting such coefficient from a table having a plurality of coefficients gradationally composed therein using the value for expressing the distance for every predetermined compositional unit as an index.

27. The program execution device for executing a draw processing program according to claim 25, wherein the coefficient definition step further comprises a step for defining such coefficient using a predetermined byte for the case that the value for expressing the distance for every predetermined compositional unit is composed of two or more bytes.

28. The program execution device for executing a draw processing program according to claim 25, wherein the coefficient definition step further comprises a step for selecting the second byte as the predetermined byte for the case that the value is composed of three bytes.

29. The program execution device for executing a draw processing program according to claim 25, wherein the coefficient definition step further comprises a step for defining as such coefficient a semi-transparent coefficient such that increasing a ratio of the second image as the distance from the virtual viewpoint increases.

30. The program execution device for executing a draw processing program according to claim 25, wherein the image generation step further comprises a step for generating the second image by subjecting the first image to a predetermined image processing.

31. The program execution device for executing a draw processing program according to claim 30, wherein the image generation step further comprises a step for subjecting the first image to blurring as the predetermined image processing.

32. The program execution device for executing a draw processing program according to claim 25, wherein the image generation step further comprises a step for generating an image composed of an arbitrary color as the second image.

33. A draw processing program to be executed on a computer comprising:

a distance setting step for setting a value expressing distance from a virtual viewpoint to every predetermined compositional unit of a first image;

an image generation step for generating a second image from the first image;

a coefficient definition step for defining a coefficient corresponding to the value for expressing the distance set to every predetermined compositional unit;

a synthetic step for synthesizing the first image and the second image based on the coefficient defined for every predetermined compositional unit; and an output step for outputting the synthesized image, wherein the coefficient definition step further comprises a stem for defining such coefficient using a predetermined byte for the case that the value for expressing the distance for every predetermined compositional unit is at least three bytes.

34. A drawing device comprising:

a distance setting unit for setting a value expressing distance from a virtual viewpoint to every predetermined compositional unit of a first image;

an image generation unit for generating a second image from the first image;

a coefficient definition unit for defining a coefficient corresponding to the value for expressing the distance set to every predetermined compositional unit, wherein the coefficient is defined using a predetermined byte when the value for expressing the distance for every predetermined compositional unit is composed of at least three bytes;

a synthetic unit for synthesizing the first image and the second image based on the coefficient defined for every predetermined compositional unit; and an output unit for outputting the synthesized image.

35. A drawing method, comprising the steps of:

setting a value for expressing distance from a virtual viewpoint to every predetermined compositional unit of a first image;

generating a second image from the first image;

defining a coefficient corresponding to the value for expressing the distance set to every predetermined compositional unit;

synthesizing the first image and the second image based on the coefficient defined for every predetermined compositional unit; and outputting the synthesized image, wherein the second image is generated by subjecting the first image to a predetermined image processing that is blurring.

36. A drawing method, comprising the steps of:

setting a value for expressing distance from a virtual viewpoint to every predetermined compositional unit of a first image;

generating a second image from the first image;

defining an α blending coefficient corresponding to the value for expressing the distance set to every predetermined compositional unit;

synthesizing the first image and the second image based on the coefficient defined for every predetermined compositional unit; and outputting the synthesized image, wherein:

the value for expressing the distance for every predetermined compositional unit is composed of twenty four bits, and the α a blending coefficient is defined using successive predetermined bits of the twenty four bits.

37. A drawing device, comprising:

a distance setting means for setting a value for expressing distance from a virtual viewpoint to every predetermined compositional unit of a first image;

an imaged generation means for generating a second image from the first image;

a coefficient definition means for defining an α blending coefficient corresponding to the value for expressing the distance set to every predetermined compositional unit;

a synthetic means for synthesizing the first image and the second image based on the coefficient defined for every predetermined compositional unit; and an output means for outputting the synthesized image, wherein:

the value for expressing the distance for every predetermined compositional unit is composed of twenty four bits, and the α blending coefficient is defined using successive predetermined bits of the twenty four bits.

38. A computer-readable recording medium having recorded therein a draw processing program to be executed on a computer, the draw processing program performing the steps of:

setting a value for expressing distance from a virtual viewpoint to every predetermined compositional unit of a first image;

generating a second image from the first image;

defining an α blending coefficient corresponding to the value for expressing the distance set to every predetermined compositional unit;

synthesizing the first image and the second image based on the coefficient defined for every predetermined compositional unit; and outputting the synthesized image, wherein:

the value for expressing the distance for every predetermined compositional unit is composed of twenty four bits, and the α blending coefficient is defined using successive predetermined bits of the twenty four bits.

39. A program execution device for executing a draw processing program, the draw processing program performing the steps of:

setting a value for expressing distance from a virtual viewpoint to every predetermined compositional unit of a first image;

generating a second image from the first image;

defining an α blending coefficient corresponding to the value for expressing the distance set to every predetermined compositional unit;

synthesizing the first image and the second image based on the coefficient defined for every predetermined compositional unit; and outputting the synthesized image, wherein:

the value for expressing the distance for every predetermined compositional unit is composed of twenty four bits, and the α blending coefficient is defined using successive predetermined bits of the twenty four bits.

* * * * *

UNITED STATES PATENT AND TRADEMARK OFFICE
CERTIFICATE OF CORRECTION

PATENT NO. : 7,167,600 B2 Page 1 of 1
APPLICATION NO. : 10/012203
DATED : January 23, 2007
INVENTOR(S) : Hiroshi Yamamoto It is certified that error appears in the above-identified patent and that said Letters Patent is hereby corrected as shown below:

Claim 25 column 11, line 58: "-processing program, such draw-" should be changed to --processing program, said program execution device including a memory wherein the draw processing program is stored, such draw--.

Claim 33 column 12, line 50: "-computer comprising :-" should be changed to --computer, said computer including a memory wherein the draw processing program is stored, said draw processing program comprising :--.

Claim 39 column 14, line 41: "-processing program, the draw-" should be changed to --processing program, said program execution device including a memory wherein the draw processing program is stored, the draw--.

Signed and Sealed this

Eighteenth Day of September, 2007

JON W. DUDAS
*Director of the United States Patent and Trademark Office*